(12) United States Patent
Lin (10) Patent No.: US 12,069,726 B2
(45) Date of Patent: Aug. 20, 2024

(54) METHOD AND APPARATUS FOR DETERMINING CYCLIC PREFIX EXTENSION AND USER EQUIPMENT

(71) Applicant: GUANGDONG OPPO MOBILE TELECOMMUNICATIONS CORP., LTD., Guangdong (CN)

(72) Inventor: Hao Lin, Neuilly-sur-seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 232 days.

(21) Appl. No.: 17/695,721

(22) Filed: Mar. 15, 2022

(65) Prior Publication Data
US 2022/0210835 A1 Jun. 30, 2022

Related U.S. Application Data

(63) Continuation of application No. PCT/CN2020/131574, filed on Nov. 25, 2020.

(30) Foreign Application Priority Data

Nov. 26, 2019 (WO) .................. PCT/IB2019/001311

(51) Int. Cl.
*H04W 74/0816* (2024.01)
*H04L 27/26* (2006.01)
(Continued)

(52) U.S. Cl.
CPC ..... *H04W 74/0816* (2013.01); *H04L 27/2607* (2013.01); *H04W 56/005* (2013.01); *H04W 74/006* (2013.01)

(58) Field of Classification Search
CPC .......... H04W 74/0816; H04W 56/005; H04W 74/006; H04L 27/2607; H04L 27/2646; H04L 5/0053
See application file for complete search history.

(56) References Cited

U.S. PATENT DOCUMENTS

| 2013/0089062 A1 | 4/2013 | Ahn |
| 2016/0013891 A1 | 1/2016 | Ji et al. |

(Continued)

FOREIGN PATENT DOCUMENTS

| CN | 102088303 A | 6/2011 |
| WO | 2021104333 A1 | 6/2021 |

OTHER PUBLICATIONS

Huawei, HiSilicon "Corrections on uplink signals and channels", R1-2000196, 3GPP TSG RAN WGI Meeting # 100-e, Feb. 24-Mar. 6, 2020 (Year: 2020).*

(Continued)

*Primary Examiner* — Chae S Lee
(74) *Attorney, Agent, or Firm* — Ladas & Parry, LLP (57) ABSTRACT

Embodiments of the disclosure provide a method and apparatus for determining a cyclic prefix extension (CPE) and a user equipment (UE). The method includes that, the UE receives first downlink control information (DCI), where the first DCI carries first indication information, the first indication information indicates the CPE, the CPE is determined based on at least one of a first value or a second value, and the first value is different from the second value; in response to the at least one of the first value or the second value not being configured through UE-specific radio resource control (RRC) signaling, the UE determines the first value according to a first rule, and/or determines the second value according to a second rule, and determines a value of the CPE based on the at least one of the first value or the second value.

14 Claims, 4 Drawing Sheets

---

201
UE receives a first DCI. The first DCI carries first indication information, and the first indication information indicates a CPE, the CPE is determined based on the first value and/or the second value, and the first value is different from the second value.

202
If the first value and/or the second value are not configured by UE-specific RRC signaling, the UE determines the first value according to the first rule, and/or determines the second value according to the second rule, and determines the value of the CPE based on the first value and/or the second value 203
If the first value and/or the second value are configured through UE-specific RRC signaling, the UE determines the value of the CPE based on the first value and/or the second value configured through the UE- specific RRC signaling.

(51) Int. Cl.
  *H04W 56/00*  (2009.01)
  *H04W 74/00*  (2009.01)

(56) References Cited

U.S. PATENT DOCUMENTS

2019/0313387 A1 10/2019 Zhang et al.
2020/0275430 A1* 8/2020 Salem ..................... H04L 5/001
2021/0345407 A1* 11/2021 Myung ................ H04L 5/0094
2022/0159712 A1* 5/2022 Myung ................ H04L 5/0007

OTHER PUBLICATIONS

International Search Report (ISR) dated Feb. 24, 2021 for Application No. PCT/CN2020/131574.

Nokia et al. "Feature Lead's Summary on Channel Access Procedures", 3GPP TSG RAN WG1 Meeting #99, R1-1912258, Nov. 22, 2019(Nov. 22, 2019), entire document.

Nokia et al. "Feature Lead's Summary #2 on Channel Access Procedures", 3GPP TSG RAN WG1 Meeting #99, R1-1913517, Nov. 22, 2019(Nov. 22, 2019), entire document.

Written Opinion of the International Searching Authority in International Application No. PCT/CN2020/131574, mailed on Feb. 24, 2021.

ZTE, Sanechips, "Remaining issues on channel access procedure for NR-U", R1-1911822, 3GPP TSG RAN WG1 Meeting #99, Reno, USA, Nov. 18-22, 2019, entire document.

Nokia, Nokia Shanghai Bell, "Channel access and co-existence for NR-U operation", R1-1912257, 3GPP TSG RAN WG1 Meeting #99, Reno, US, Nov. 18-22, 2019, entire document.

Huawei, HiSilicon, "Corrections on uplink signals and channels", R1-2000196, 3GPP TSG RAN WGI Meeting #100-e, Feb. 24-Mar. 6, 2020, entire document.

The EESR of corresponding European application application No. 20891639.5 dated on Sep. 12, 2022.

* cited by examiner

METHOD AND APPARATUS FOR DETERMINING CYCLIC PREFIX EXTENSION AND USER EQUIPMENT

CROSS-REFERENCE TO RELATED APPLICATIONS

This application is a continuation of International Application No. PCT/CN2020/131574, filed on Nov. 25, 2020, which claims priority to International Application No. PCT/IB2019/001311, filed on Nov. 26, 2019. The disclosures of the aforementioned applications are hereby incorporated by reference in their entireties.

TECHNICAL FIELD

Embodiments of the present disclosure relate to mobile communication, and in particular, to a method and device for determining a cyclic prefix extension (CPE), and a user equipment (UE).

BACKGROUND

The value of the CPE is determined based on some parameters, for example, C2, or C3, or C1.

The values of C2 and C3 are radio resource control (RRC) configured. One problem is that during an initial access phase, the UE has not been configured by RRC configuration. Thus, when the base station (gNB) indicates the CPE which depends on C2 or C3, how the UE determines the CPE is still an open issue.

SUMMARY

An embodiment of the present disclosure provides a method for determining a cyclic prefix extension (CPE). The method includes: receiving, by a user equipment (UE), first downlink control information (DCI), wherein the first DCI carries first indication information, the first indication information indicates the CPE, the CPE is determined based on at least one of a first value or a second value, and the first value is different from the second value; and in response to the at least one of the first value or the second value not being configured through UE-specific radio resource control (RRC) signaling, determining, by the UE, the first value according to a first rule; and/or determining the second value according to a second rule, and determining a value of the CPE based on the at least one of the first value or the second value.

An embodiment of the present disclosure provides an apparatus for determining a cyclic prefix extension (CPE), applied to a user equipment (UE). The apparatus includes a reception unit and a determination unit. The reception unit is configured to receive first downlink control information (DCI), wherein the first DCI carries first indication information, the first indication information indicates the CPE, the CPE is determined based on at least one of a first value or a second value, and the first value is different from the second value. The determination unit is configured to, in response to the at least one of the first value or the second value not being configured through UE-specific radio resource control (RRC) signaling, determine the first value according to a first rule, and/or determine the second value according to a second rule, and determine a value of the CPE based on the at least one of the first value or the second value.

An embodiment of the present disclosure provides a user equipment (UE). The UE includes a processor and a memory storing a computer program, wherein the processor is configured to call and run the computer program stored in the memory, to execute the above method.

An embodiment of the present disclosure provides a chip for implementing the above method for determining a CPE. The chip includes a processor for calling a computer program from a memory and running the computer program, to cause a device installed with the chip to execute the above method for determining a CPE.

An embodiment of the present disclosure provides a computer-readable storage medium for storing a computer program that causes a computer to execute the above method for determining a CPE.

An embodiment of the present disclosure provides a computer program product comprising computer program instructions, the computer program instructions causing a computer to execute the above method for determining a CPE.

An embodiment of the present disclosure provides a computer program, which when running on a computer, causes the computer to execute the above method for determining a CPE.

Through the above technical solution, for the CPE determined based on the first value and/or the second value, if the first value and/or the second value are not configured through UE-specific RRC signaling, the UE can determine the first value and/or the second value in a specific manner, so that the value of the CPE can be further determined based on the determined first value and/or second value.

BRIEF DESCRIPTION OF DRAWINGS

The accompanying drawings described herein which form a part of the disclosure are provided for the better understanding of the disclosure, and exemplary embodiments of the disclosure and description thereof serve to illustrate the disclosure but are not to be construed as improper limitations to the disclosure. In the accompanying drawings.

DESCRIPTION OF EMBODIMENTS

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, for example: Long Term Evolution (LTE) system, LTE Frequency Division Duplex (FDD) system, LTE Time Division Duplex Time Division Duplex (TDD) system, 5G communication system or future communication system, etc.

Figure 1:
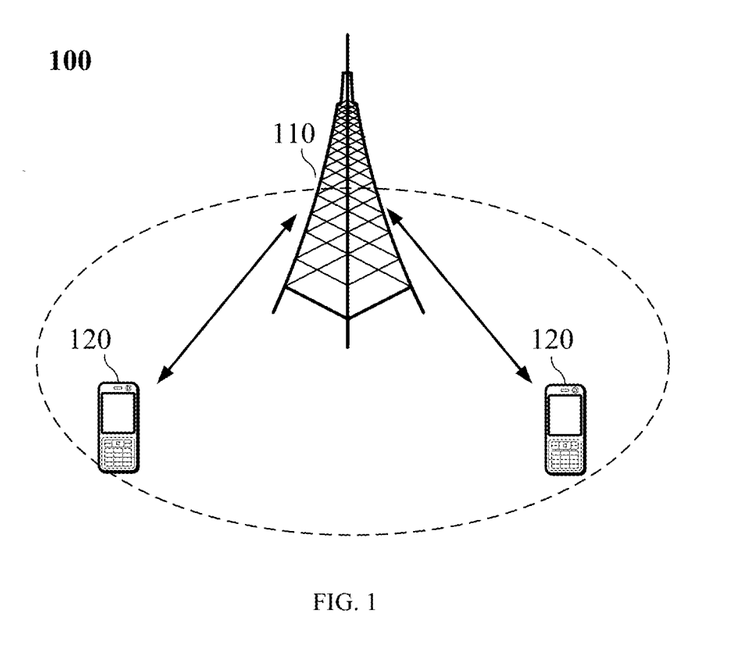
FIG. 1 illustrates a schematic diagram of a communication system architecture according to an embodiment of the present disclosure.

Exemplarily, the communication system 100 applied in the embodiment of the present disclosure is illustrated in FIG. 1. The communication system 100 may include a network device 110, and the network device 110 may be a device that communicates with a terminal 120 (or referred to as a communication terminal, or a terminal). The network device 110 can provide communication coverage for a specific geographic area, and can communicate with terminals located within the coverage area. Alternatively, the network device 110 may be an evolutionary Node B (eNB or eNodeB) in the LTE system, or a wireless controller in a cloud radio access network (Cloud Radio Access Network, CRAN), or the network device may be a mobile switching center, a relay station, an access point, an in-vehicle device, a wearable device, a hub, a switch, a bridge, a router, a network-side device in a 5G network, or a network device in a future communication system.

The communication system 100 further includes at least one terminal 120 located within the coverage of the network device 110. As used herein, "terminals" include, but are not limited to, connections via wired lines, such as via Public Switched Telephone Networks (PSTN), Digital Subscriber Lines (DSL), digital cables, and direct cable connections; and/or another data connection/network; and/or via a wireless interface, such as cellular networks, wireless local area networks (WLAN), digital TV networks such as DVB-H networks, satellite networks, AM-FM Broadcast transmitter; and/or another terminal is arranged to receive/transmit communication signals; and/or Internet of Things (IoT) equipment. A terminal configured to perform communication through a wireless interface may be referred to as a "wireless communication terminal", "wireless terminal", or "mobile terminal". Examples of mobile terminals include, but are not limited to, satellites or cellular telephones; Personal Communications System (PCS) terminals that can combine cellular radiotelephones with data processing, facsimile, and data communication capabilities; PDAs including mobile phones, pagers, Internet/internal network access, web browser, notepad, calendar, and/or Global Positioning System (GPS) receiver; conventional laptop and/or palm-type receivers; or other electronic devices including wireless transceivers. The terminal may be an access terminal, a user equipment (UE), a subscriber unit, a user station, a mobile station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), or a handheld device with a wireless communication function, a computing device or other processing device connected to a wireless modem, an in-vehicle device, a wearable device, a terminals in a 5G network, or a terminal in a future evolved PLMN, and etc.

Alternatively, device-to-device (Device to Device, D2D) communication may be performed between the terminals 120.

Alternatively, the 5G communication system or 5G network may also be referred to as a New Radio (NR) system or an NR network.

FIG. 1 exemplarily illustrates one network device and two terminals. Alternatively, the communication system 100 may include multiple network devices, and each network device may include other numbers of terminals within the coverage area. Embodiments of the present disclosure make no limits on this.

Alternatively, the communication system 100 may further include other network entities such as a network controller and a mobility management entity, which is not limited in the embodiments of the present disclosure.

It should be understood that the devices with communication functions in the network/system in the embodiments of the present disclosure may be referred to as communication devices. Taking the communication system 100 illustrated in FIG. 1 as an example, the communication device may include a network device 110 and a terminal 120 having a communication function, and the network device 110 and the terminal 120 may be the specific devices described above, which will not be repeated here. The communication device may further include other devices in the communication system 100, such as network controllers, mobility management entities, and other network entities, which are not limited in the embodiments of the present disclosure.

It should be understood that the terms "system" and "network" are often used interchangeably herein. The term "and/or" in this article is just an association relationship that describes an associated object, indicating that there can be three relationships, for example, A and/or B, which can mean: A exists alone, A and B exist at the same time, B exists alone. In addition, the character "/" in this article generally indicates that the related objects before and after the character "/" have an "or" relationship.

To facilitate understanding of the technical solutions of the embodiments of the present disclosure, the technical solutions related to the embodiments of the present disclosure will be described below.

Cyclic Prefix Extension (CPE)

There is an agreement about the Listen-Before-Talk (LBT) type and cyclic prefix extension (CPE) indication. 2-bit can be used to indicate both LBT type and CP extension (CPE). However the CPE is a function of values C2, or C3, or C1 as shown in table 1 below:

TABLE 1

| LBT type | CP extension |
| --- | --- |
| Cat1 16 µs | C2*symbol length - 16 µs - TA |
| Cat2 25 µs | C3*symbol length - 25 µs - TA |
| Cat2 25 µs | C1*symbol length - 25 µs |
| Cat4 | 0 |

The values of C2 and C3 are radio resource control (RRC) configured. One problem is that during the initial access phase, the UE has not been configured by RRC configuration. Thus, when the base station (gNB) indicates the CPE which depends on C2 or C3, how the UE determines the CPE is still an open issue.

At least for Load Based Equipment (LBE) operation, it is agreed that for signaling of LBT type and CP extension for both fallback downlink (DL) assignment and fallback uplink (UL) Grant, the following rule is used:

Channel Access Priority Class (CAPC) is not indicated explicitly:
For the UL grants
the UE assumes CAPC=4 was used by the gNB to acquire the COT,
for UE initiated COTs (Cat4 case) the UE may select the CAPC by itself.

It is to be noted that, the mapping between priority classes and traffic classes follows the same mechanism as defined for UL CG transmissions.

It is to be noted that, for PUCCH associated with DL assignments may use the highest priority CAPC when CAT4 LBT is used, as agreed earlier.

In order to solve the above technical problems, the following technical solutions are proposed in the embodiments of the disclosure. The present disclosure relates to the field of communication technologies. The communication technology is for example a 5G (fifth generation) network using the 5G NR (New Radio) as radio access technology (RAT) defined by 3GPP. The present disclosure is applicable to 5G NR-U (NR in unlicensed spectrum).

Figure 2:
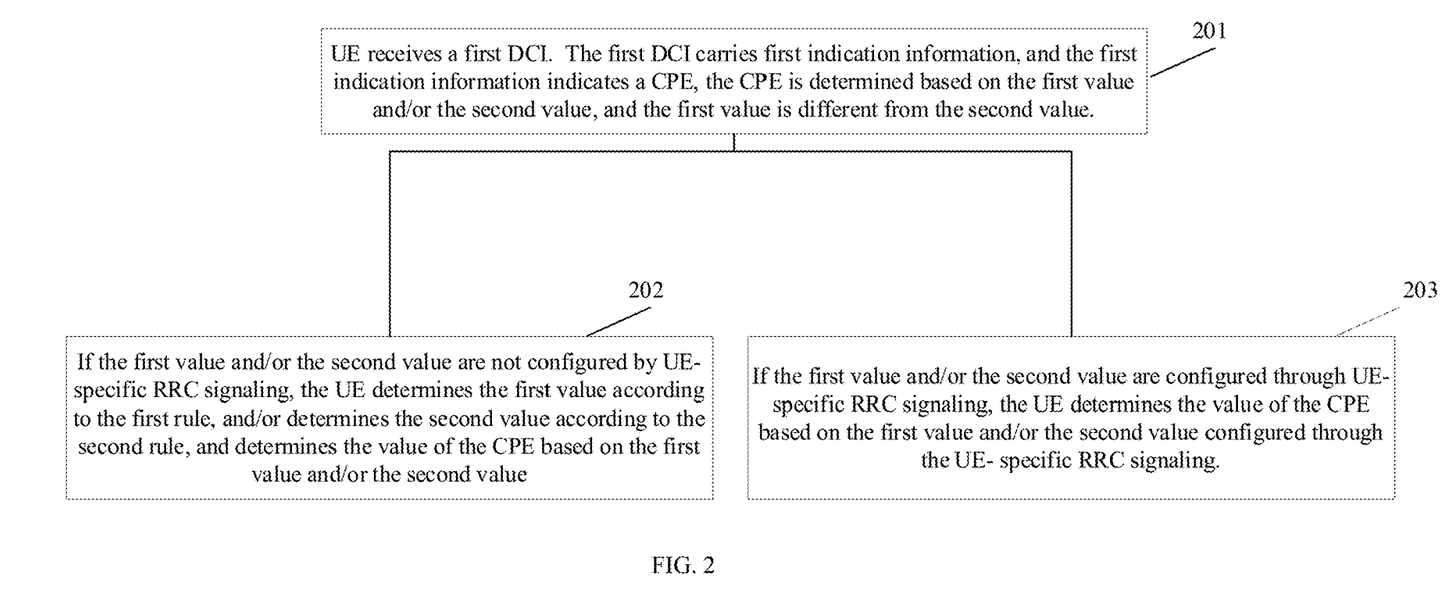
FIG. 2 illustrates a schematic flowchart of a method for determining a CPE according to an embodiment of the present disclosure.

FIG. 2 illustrates a schematic flowchart of a method for determining a CPE according to an embodiment of the present disclosure. As illustrated in FIG. 2, the method for determining a CPE includes the following actions 201 and 202.

In action 201, the UE receives a first DCI. The first DCI carries first indication information, and the first indication information indicates a CPE, and the CPE is determined based on the first value and/or the second value. The first value is different from the second value.

In the embodiment of the present disclosure, the first value refers to C2, and the second value refers to C3. The value of CPE is a function of C2 and TA, or the value of CPE is a function of C3 and TA.

In action 202, if the first value and/or the second value are not configured by UE-specific RRC signaling, the UE determines the first value according to the first rule, and/or determines the second value according to the second rule, and determines the value of the CPE based on the first value and/or the second value.

In an embodiment of the disclosure, the UE may determine the first value (i.e., C2) in any of the following manners.

Manner 1-1

The UE determines the first value based on TA, a symbol length, and a first LBT gap.

Specifically, the first value is determined by the following formula: C2=ceil((D1+TA)/Ls), where C2 represents the first value, D1 represents the first LBT gap, TA represents the timing advance, Ls represents the symbol length, and ceil represents a ceiling operation.

Here, the size of Ls is related to subcarrier spacing (SCS), and different SCSs correspond to Lss of different sizes.

Manner 1-2

The UE determines that the first value is a predefined first integer value, and the first integer value is greater than or equal to 1 and less than or equal to 28.

Manner 1-3

The UE acquires the first value from the received random access response (RAR).

In the embodiment of the present disclosure, the following special cases for the first value are considered: if the first value is invalid, the value of the CPE determined based on the first value is invalid; or, if the first value is invalid, it is determined that the CPE is to be re-interpreted based on the first value.

In the above technical schemes of the present disclosure, the first value C2 determination includes at least one of the following: (i) C2 value is derived from the UE-specific timing advance (TA) and a symbol duration (Ls) and a first Listen-Before-Talk (LBT) gap (D1), such that C2=ceil((D1+TA)/Ls), where ceil(x) is a ceiling operation, which gives a smallest integer that is larger than x; or (ii) C2 value is a pre-defined integer value in the range from 1 to 28; or (iii) C2 value is given in a random access response (RAR); or (iv) C2 value is invalid and therefore the CPE, which is depending on C2 value, is also invalid; or (v) C2 value is invalid and therefore CPE, which is depending on C2 value, is reinterpreted.

In the embodiment of the present disclosure, the UE may determine the second value (that is, C3) in any one of the following manners.

Manner 2-1

The UE determines the second value based on TA, symbol length, and second LBT gap.

Specifically, the second value is determined by the following formula: C3=ceil((D2+TA)/Ls), where C3 represents the second value, D2 represents a second LBT gap, TA represents a timing advance, Ls represents a symbol length, and ceil represents a ceiling operation.

Manner 2-2

The UE determines that the second value is a predefined second integer value, and the second integer value is greater than or equal to 1 and less than or equal to 28.

Manner 2-3

The UE acquires the second value from the received RAR.

In the embodiment of the present disclosure, the following special cases for the second value are considered: if the second value is invalid, the CPE determined based on the second value is invalid; or, if the second value is invalid, it is determined that the CPE is to be re-interpreted based on the second value.

In the above technical schemes of the present disclosure, the second value C3 determination includes at least one of the following: (i) C3 value is derived from the UE-specific timing advance (TA) and a symbol duration (Ls) and a second Listen-Before-Talk (LBT) gap (D2), such that C3=ceil((D2+TA)/Ls), where ceil(x) is a ceiling operation, which gives a smallest integer that is larger than x; or (ii) C3 value is a pre-defined integer value in the range from 1 to 28; or (iii) C3 value is given in a random access response (RAR); or (iv) C3 value is invalid and therefore the CPE, which is depending on C3 value, is also invalid; or (v) C3 value is invalid and therefore CPE, which is depending on C3 value, is reinterpreted.

In the above solution, the CPE reinterpretation is independent from TA, that is, when the CPE is reinterpreted, the determination of the CPE is independent of the TA. Alternatively, the CPE is reinterpreted as (TA independent CPE reinterpretation is defined as):

$$CPE=C1*Ls-D1; \text{ or,}$$

$$CPE=C1*Ls-D2; \text{ or,}$$

$$CPE=0;$$

where C1 has a specific value, Ls represents a symbol length, D1 represents a first LBT gap, and D2 represents a second LBT gap.

In the above solution, alternatively, in the case of 15 khz or 30 khz SCS, the value of C1 is 1; in the case of 60 khz SCS, the value of C1 is 2.

Alternatively, the technical solution of the embodiments of the present disclosure further includes the following actions:

In action 203, if the first value and/or the second value are configured through UE-specific RRC signaling, the UE determines the value of the CPE based on the first value and/or the second value configured through the UE-specific RRC signaling.

It is to be noted that the above actions 202 and 203 may be performed in alternative, i.e., one of actions 202 and 203 may be selected.

For the above actions 202 or 203, after acquiring (or determining) the first value and/or the second value, the UE may determine the value of the CPE in at least one of the following manners:

Manner 1: CPE=C2*Ls-D1-TA;

Manner 2: CPE=C3*Ls-D2-TA;

where C2 represents the first value, C3 represents the second value, Ls represents a symbol length, D1 represents a first LBT gap, D2 represents a second LBT gap, and TA represents a timing advance.

In the above solution, the values of D1 and D2 are different. Alternatively, one of D1 and D2 takes a value of 16 µs, and the other takes a value of 25 µs.

In an embodiment of the present disclosure, a method is proposed, performed by a user equipment (UE), for determining a cyclic prefix extension (CPE), comprising the steps of receiving a first control information (DCI) containing a first indication related to the CPE which is a function of a first value (C2) or a second value (C3) and a timing advance (TA) information; and determining the CPE, such that: (i) if the first and second values C2 and C3 are configured by UE-specific radio resource control (RRC), the CPE is determined based on the configured first value C2 and/or second value C3; or (ii) if the first and second values C2 and C3 are not configured by UE-specific RRC, the CPE is determined on a first value C2 determination and/or on a second value C3 determination.

The technical schemes of the embodiment of the present disclosure will be described below with specific examples.

Example 1

In this example, in the initial access phase when the UE-specific RRC configuration is not done. Using Table 1, the UE will determine the C2 and C3 as follows.

The C2 and C3 values are derived from the UE-specific timing advance (TA) and the symbol length (Ls) such as C2=ceil((TA+16p)/Ls) and C3=ceil((TA+15p)/Ls), where ceil(x) is the ceiling operation, which gives the smallest integer that is larger than x; TA is the UE-specific timing advance in unit (µs) and Ls is the OFDM symbol length in unit (µs), which depends further on the subcarrier spacing.

TA is indicated in RAR responding to the Msg1 sent by UE. This determination applies for DL DCI scheduling DL data transmission (PDSCH), e.g. DCI format 1_0; and/or DL DCI scheduling UL data transmission (PUSCH), e.g. DCI format 0_0; and/or UL data transmission scheduling by RAR.

Example 2

In this example, in the initial access phase when the UE-specific RRC configuration is not done. Using Table 1, the UE will determine the C2 and C3 as follows.

The C2 and C3 are fixed in the standard specifications. The candidate values are integers from 1 up to 28. C2 and C3 can be fixed to any of these values. This determination applies for DL DCI scheduling DL data transmission (PDSCH), e.g. DCI format 1_0; and/or DL DCI scheduling UL data transmission (PUSCH), e.g. DCI format 0_0; and/or UL data transmission scheduling by RAR.

Example 3

In this example, in the initial access phase when the UE-specific RRC configuration is not done. Using Table 1, the UE will determine the C2 and C3 as follows.

The first two rows of Table 1 are not valid, so that the specification can forbid to use these first two rows, which contain C2 or C3. This means that the UE does not expect that gNB will indicate these two rows, instead the UE will expect that the gNB will only indicate the last two rows of Table 1, which do not contain C2 or C3. These two rows will become valid after the UE-specific RRC configuration is completed. This determination applies for DL DCI scheduling DL data transmission (PDSCH), e.g. DCI format 1_0; and/or DL DCI scheduling UL data transmission (PUSCH), e.g. DCI format 0_0; and/or UL data transmission scheduling by RAR.

Example 4

In this example, in the initial access phase when the UE-specific RRC configuration is not done. Using Table 1, the UE will determine the C2 and C3 as follows.

The first two rows of Table 1 will be reinterpreted. When the first row is indicated, i.e. LBT type=Cat1 16 µs, CP extension=C2*symbol length-16 µs-TA, UE will reinterpret this indication as the third row, i.e. LBT type=Cat2 25 µs, CP extension=C1*symbol length-25 µs. Alternatively, the UE will reinterpret this indication as the forth row, i.e. LBT type=Cat4, CP extension=0.

When the second row of Table 1 is indicated, i.e. LBT type=Cat2 25 µs, CP extension=C3*symbol length-16 µs-TA, UE will reinterpret this indication as the third row, i.e. LBT type=Cat2 25 µs, CP extension=C1*symbol length-25 µs. Alternatively, the UE will reinterpret this indication as the forth row, i.e. LBT type=Cat4, CP extension=0.

This determination applies for DL DCI scheduling DL data transmission (PDSCH), e.g. DCI format 1_0; and/or DL DCI scheduling UL data transmission (PUSCH), e.g. DCI format 0_0; and/or UL data transmission scheduling by RAR.

Example 5

In this example, in the initial access phase when the UE-specific RRC configuration is not done. Using Table 1, the UE will determine the C2 and C3 as follows.

The C2 and C3 in Table 1 will be configured directly by gNB and the configuration of C2 and C3 are given in random access response (RAR). This determination applies for DL DCI scheduling DL data transmission (PDSCH), e.g. DCI format 1_0; and/or DL DCI scheduling UL data transmission (PUSCH), e.g. DCI format 0_0; and/or UL data transmission scheduling by RAR.

Example 6

In this example, in the initial access phase when the UE-specific RRC configuration is not done. The UE will determine the C2 and C3 in Table 1, in the same way, e.g. any one of the methods presented in Example 1-5, for DL DCI scheduling DL data transmission (PDSCH), e.g. DCI format 1_0; and DL DCI scheduling UL data transmission (PUSCH), e.g. DCI format 0_0; and RAR scheduling UL data transmission (PUSCH).

Example 7

In this example, in the initial access phase when the UE-specific RRC configuration is not done. The UE will determine the C2 and C3 in Table 1, with any one of the methods presented in Example 1-5, but the method selected for DL DCI scheduling DL data transmission (PDSCH), e.g. DCI format 1_0, is different for DL DCI scheduling UL data transmission (PUSCH), e.g. DCI format 1_0; or RAR scheduling UL data transmission (PUSCH).

Figure 3:
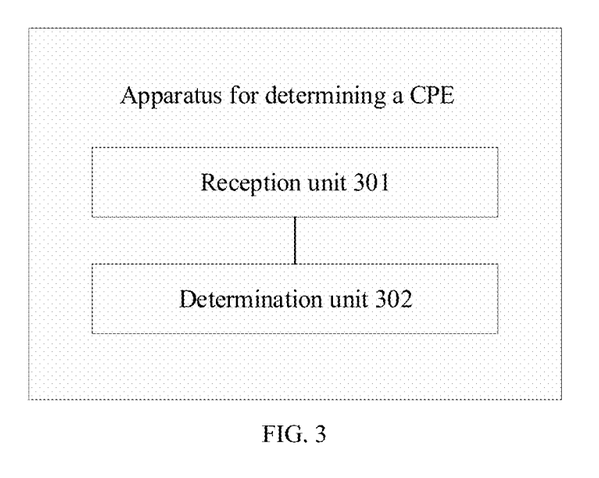
FIG. 3 illustrates a schematic structural diagram of an apparatus for determining a CPE according to an embodiment of the present disclosure.

FIG. 3 illustrates a schematic structural diagram of an apparatus for determining a CPE according to an embodiment of the present disclosure, and is applied to a UE. As illustrated in FIG. 3, the apparatus for determining a CPE includes a reception unit 301 and a determination unit 302.

The reception unit 301 is configured to receive first downlink control information (DCI). The first DCI carries first indication information, and the first indication information indicates a CPE, and the CPE is determined based on the first value and/or the second value. The first value is different from the second value.

The determination unit 302 is configured to determine the first value according to the first rule, and/or determine the second value according to the second rule, if the first value and/or the second value are not configured by UE-specific RRC signaling, and determine the value of the CPE based on the first value and/or the second value.

In an embodiment of the disclosure, the determination unit 302 is configured to determine the first value based on a timing advance TA, a symbol length, and a first LBT gap.

In an embodiment of the disclosure, the first value is determined by the following formula:

$$C2 = \mathrm{ceil}((D1+TA)/Ls),$$

where C2 represents the first value, D1 represents the first LBT gap, TA represents a timing advance, Ls represents a symbol length, and ceil represents a ceiling operation.

In an embodiment of the disclosure, the determination unit 302 is configured to determine that the first value is a predefined first integer value, and the first integer value is greater than or equal to 1, and less than or equal to 28.

In an embodiment of the disclosure, the determination unit 302 is configured to acquire the first value from the received random access response RAR.

In an embodiment of the disclosure, if the first value is invalid, the value of the CPE determined based on the first value is invalid; or, if the first value is invalid, it is determined based on the first value that CPE is to be reinterpreted.

In an embodiment of the disclosure, the determination unit 302 is configured to determine the second value based on the TA, a symbol length, and a second LBT gap.

In an embodiment of the disclosure, the second value is determined by the following formula:

$$C3 = \mathrm{ceil}((D2+TA)/Ls),$$

where C3 represents a second value, D2 represents a second LBT gap, TA represents a timing advance, Ls represents a symbol length, and ceil represents a ceiling operation.

In an embodiment of the disclosure, the determination unit 302 is configured to determine that the second value is a predefined second integer value, and the second integer value is greater than or equal to 1, and less than or equal to 28.

In an embodiment of the disclosure, the determination unit 302 is configured to acquire the second value from the received RAR.

In an embodiment of the disclosure, if the second value is invalid, the CPE determined based on the second value is invalid; or, if the second value is invalid, it is determined that the CPE is to be reinterpreted based on the second value.

In an embodiment of the disclosure, the CPE is reinterpreted independently of the TA.

In an embodiment of the disclosure, the CPE is reinterpreted as:

$$CPE = C1*Ls - D1; \text{ or,}$$

$$CPE = C1*Ls - D2; \text{ or,}$$

$$CPE = 0,$$

where C1 has a specific value, Ls represents a symbol length, D1 represents a first LBT gap, and D2 represents a second LBT gap.

In an embodiment of the disclosure, in the case of 15 kHz or 30 kHz subcarrier spacing SCS, the value of C1 is 1; in the case of 60 kHz SCS, the value of C1 is 2.

In an embodiment of the disclosure, if the first value and/or the second value is configured through the UE-specific RRC signalling, the determination unit 302 is further configured to determine the value of the CPE, based on the first value and/or the second value configured through the UE-specific RRC signalling.

In an embodiment of the disclosure, the value of the CPE is determined in at least one of the following manners:
manner 1: CPE=C2*Ls-D1-TA;
manner 2: CPE=C3*Ls-D2-TA,
where C2 represents a first value, C3 represents a second value, Ls represents a symbol length, D1 represents a first LBT gap, D2 represents a second LBT gap, and TA represents a timing advance.

In an embodiment of the disclosure, the value of D1 is different from the value of D2.

In an embodiment of the disclosure, one of D1 and D2 takes a value of 16 μs, and the other takes a value of 25 μs.

Those skilled in the art should understand that the relevant description of the above-mentioned apparatus for determining a CPE in the embodiments of the present disclosure can be understood by referring to the relevant description of the method for determining a CPE in the embodiments of the present disclosure.

It is to be noted that, the technical schemes in the embodiment of the disclosure may be applied in a mobile communication system. Alternatively, the mobile telecommunication system is a 5G mobile network comprising a 5G NR access network. The present example embodiment is applicable to NR in unlicensed spectrum (NR-U). The present disclosure can be applied to other mobile networks, in particular to mobile network of any further generation cellular network technology (6G, etc.).

Figure 4:
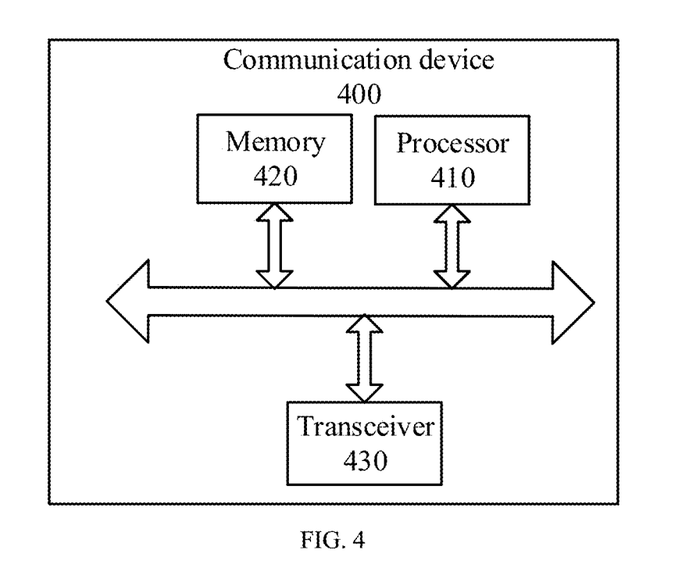
FIG. 4 illustrates a block diagram of a communication device according to an embodiment of the present disclosure.

FIG. 4 illustrates a schematic structural diagram of a communication device 400 according to an embodiment of the present disclosure. The communication device 400 illustrated in FIG. 4 may be a UE, and includes a processor 410, and the processor 410 may call a computer program from a memory and run the computer program to implement the method in the embodiments of the present disclosure.

Alternatively, as illustrated in FIG. 4, the communication device 400 may further include a memory 420. The processor 410 can call a computer program from the memory 420 and run the computer program to implement the method in the embodiments of the present disclosure.

The memory 420 may be a separate device independent of the processor 410, or may be integrated in the processor 410.

Alternatively, as illustrated in FIG. 4, the communication device 400 may further include a transceiver 430, and the processor 410 may control the transceiver 430 to communicate with other devices, specifically, may send information or data to other devices, or receive other information or data sent by the device.

The transceiver 430 may include a transmitter and a receiver. The transceiver 430 may further include antennas, and the number of antennas may be one or more.

Alternatively, the communication device 400 may specifically be a network device according to an embodiment of the present disclosure, and the communication device 400 may implement the corresponding process implemented by the network device in each method of the embodiment of the present disclosure.

Alternatively, the communication device 400 may specifically be a mobile terminal/user device according to an embodiment of the present disclosure, and the communication device 400 may implement the corresponding process implemented by the mobile terminal/user device in each method of the embodiment of the present disclosure. For simplicity, the description will not be repeated here.

Figure 5:
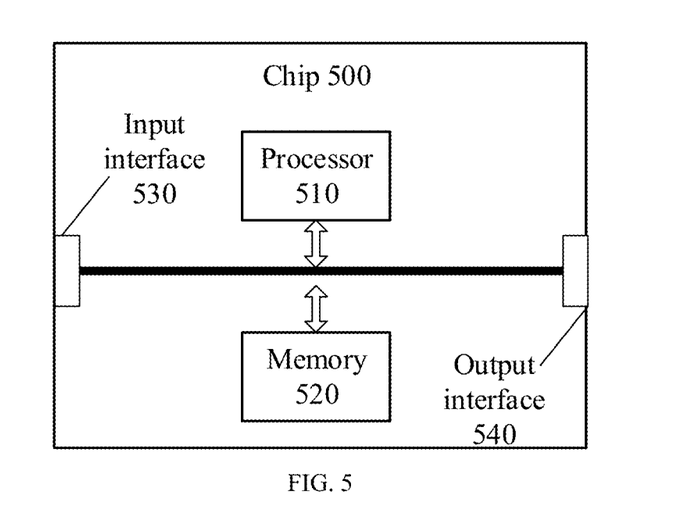
FIG. 5 illustrates a block diagram of a chip according to an embodiment of the present disclosure.

FIG. 5 illustrates a block diagram of a chip according to an embodiment of the disclosure. As illustrated in FIG. 5, the chip 500 includes a processor 510. The processor 510 may call and execute the computer programs in a memory to execute the method in the embodiments of the disclosure.

In at least one embodiment, as illustrated in FIG. 5, the chip 500 may further include a memory 520. The processor 510 may call and execute the computer programs in the memory 520 to execute the method in the embodiments of the disclosure.

The memory 520 may be a separate device from the processor 510, or may be integrated into the processor 510.

In at least one embodiment, the chip 500 may further include an input interface 530. The processor 510 may control the input interface 530 to communicate with another device or chip. Specifically, the processor 510 may control the input interface 530 to obtain information or data from another device or chip.

In at least one embodiment, the chip 500 may further include an output interface 540. The processor 510 may control the output interface 540 to communicate with another device or chip. Specifically, the processor 510 may control the output interface 540 to send information or data to another device or chip.

In at least one embodiment, the chip may be applied to the network device in the embodiments of the disclosure. The chip may implement a corresponding process implemented by the network device in each method embodiment of the disclosure, which will not be elaborated herein for brief description.

In at least one embodiment, the chip may be applied to the terminal/mobile terminal in the embodiments of the disclosure. The chip may implement a corresponding process implemented by the terminal/mobile terminal in each method embodiment of the disclosure, which will not be elaborated herein for brief description.

It is to be understood that in the embodiments of the disclosure, the chip may also be referred to as a system level chip, a system chip, a chip system or a system-on-chip.

Figure 6:
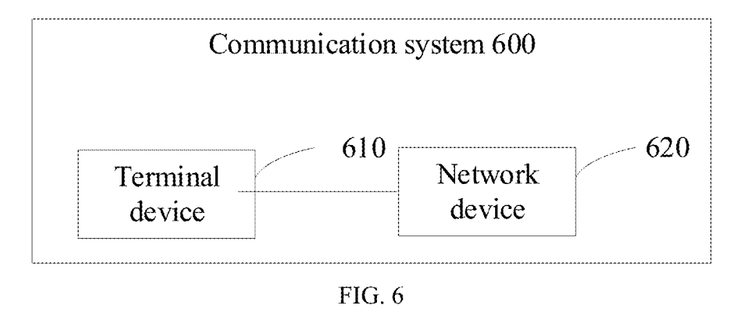
FIG. 6 illustrates a schematic block diagram of a communication system according to an embodiment of the present disclosure.

FIG. 6 illustrates a schematic block diagram of a communication system 600 according to an embodiment of the present disclosure. As illustrated in FIG. 6, the communication system 600 includes a UE 610 and a network device 620.

The UE 610 may be configured to implement the corresponding function implemented by the UE in the above method, and the network device 620 may be configured to implement the corresponding function implemented by the network device in the above method.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and performs the operations of the above methods in combination with hardware of the processor.

It may be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

The embodiments of the disclosure also provide a computer-readable storage medium for storing one or more computer programs.

In at least one embodiment, the computer-readable storage medium may be applied in the network device of the embodiments of the disclosure. The computer programs may enable a processor to perform the corresponding process implemented by the network device in each method embodiment of the disclosure, which will not be elaborated herein for brevity.

In at least one example, the computer-readable storage medium may be applied in the terminal/mobile terminal of the embodiments of the disclosure. The computer programs may enable a processor to perform the corresponding process implemented by the terminal/mobile terminal in each method embodiment of the disclosure, which will not be elaborated herein for brevity.

The embodiments of the disclosure also provide a computer program product. The computer program product includes one or more computer program instructions.

In at least one embodiment, the computer program product may be applied in the network device of the embodiments of the disclosure. The computer program instructions may enable a processor to perform the corresponding process implemented by the network device in each method embodiment of the disclosure, which will not be elaborated herein for brevity.

In at least one example, the computer program product may be applied in the terminal/mobile terminal of the embodiments of the disclosure. The computer program instructions may enable a processor to perform the corresponding process implemented by the terminal/mobile terminal in each method embodiment of the disclosure, which will not be elaborated herein for brevity.

The embodiments of the disclosure also provide a computer program.

In at least one embodiment, the computer program may be applied in the network device of the embodiments of the disclosure. The computer program, when executed by a processor, enables a processor to perform the corresponding process implemented by the network device in each method embodiment of the disclosure, which will not be elaborated herein for brevity.

In at least one example, the computer program may be applied in the terminal/mobile terminal of the embodiments of the disclosure. The computer program, when executed by a processor, enables a processor to perform the corresponding process implemented by the terminal/mobile terminal in each method embodiment of the disclosure, which will not be elaborated herein for brevity.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn that specific working processes of the system, device and unit described above may refer to the corresponding processes in the method embodiment and will not be elaborated herein for convenient and brief description.

In some embodiments according to the disclosure, it is to be understood that the disclosed system, apparatus and method may be implemented in another manner. For example, the apparatus embodiment described above is only schematic, and for example, division of the units is only a logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, the device or the units, and may be electrical and mechanical or in other forms.

The units described as separate parts may or may not be separated physically, and parts displayed as units may or may not be physical units, namely may be located in a same place, or may be distributed among multiple network units. Part or all of the units may be selected according to a practical requirement to achieve the purpose of the solutions of the embodiments.

In addition, each functional unit in each embodiment of the disclosure may be integrated into a processing unit, each unit may exist physically independently, or two or more units may be integrated into a unit.

When being realized in form of software functional unit and sold or used as an independent product, the function may also be stored in a computer-readable storage medium. Based on such an understanding, part of technical solutions of the disclosure substantially making contributions to the prior art may be embodied in form of a software product, and the computer software product is stored in a storage medium, including a plurality of instructions which enable a computer device (which may be a personal computer, a server, a network device or the like) to execute all or part of the operations of the method in each embodiment of the disclosure. The abovementioned storage medium includes: various media capable of storing program codes, such as a U disk, a mobile hard disk, a ROM, a RAM, a magnetic disk or an optical disk.

The above is only the specific embodiments of the disclosure and not intended to limit the scope of the disclosure. Any variations or replacements apparent to those skilled in the art within the technical scope disclosed by the disclosure shall fall within the scope of the disclosure. Therefore, the scope of the disclosure shall be subject to the scope of the claims.

What is claimed is:

1. A method for determining a cyclic prefix extension (CPE), comprising:
receiving, by a user equipment (UE), first downlink control information (DCI), wherein the first DCI carries first indication information, the first indication information indicates the CPE, the CPE is determined based on at least one of a first value or a second value, and the first value is different from the second value;
in response to the at least one of the first value or the second value not being configured through UE-specific radio resource control (RRC) signaling,
performing, by the UE, at least one of the following:
determining the first value according to a first rule; or
determining the second value according to a second rule, and
determining a value of the CPE based on the at least one of the first value or the second value;
wherein determining, by the UE, the first value according to the first rule comprises:
determining, by the UE, the first value based on a timing advance (TA), a symbol length, and a first listen-before-talk (LBT) gap;
wherein the first value is determined by the following formula:

$C2=\text{ceil}((D1+TA)/Ls)$, where C2 represents the first value, D1 represents the first LBT gap, TA represents the timing advance, Ls represents the symbol length, and ceil represents a ceiling operation.

2. The method of claim 1, wherein determining, by the UE, the second value according to the second rule comprises:
determining, by the UE, the second value based on a TA, a symbol length, and a second LBT gap.

3. The method of claim 2, wherein the second value is determined by the following formula:

$C3=\text{ceil}((D2+TA)/Ls)$, where C3 represents the second value, D2 represents the second LBT gap, TA represents the timing advance, Ls represents the symbol length, and ceil represents a ceiling operation.

4. The method of claim 1, wherein determining, by the UE, the second value according to the second rule comprises:
acquiring, by the UE, the second value from a received RAR.

5. The method of claim 1, wherein the value of the CPE is determined in at least one of the following manners:

$CPE=C2*Ls-D1-TA$; or, $CPE=C3*Ls-D2-TA$;

where C2 represents the first value, C3 represents the second value, Ls represents a symbol length, D1 represents a first LBT gap, D2 represents a second LBT gap, and TA represents a timing advance.

6. The method of claim 5, wherein D1 and D2 have different values.

7. The method of claim 6, wherein one of D1 and D2 has a value of 16 μs, and another of D1 and D2 has a value of 25 μs.

8. An apparatus for determining a cyclic prefix extension (CPE), applied to a user equipment (UE) and comprising:
a processor, a transceiver and a memory storing a computer program, wherein the processor is configured to call and run the computer program stored in the memory to:
receive first downlink control information (DCI), wherein the first DCI carries first indication information, the first indication information indicates the CPE, the CPE is determined based on at least one of a first value or a second value, and the first value is different from the second value; and
in response to the at least one of the first value or the second value not being configured through UE-specific radio resource control (RRC) signaling,
perform at least one of the following:
determining the first value according to a first rule; or
determining the second value according to a second rule, and
determine a value of the CPE based on the at least one of the first value or the second value;
wherein the processor is configured to determine the first value based on a timing advance (TA), a symbol length, and a first listen-before-talk (LBT) gap;
wherein the first value is determined by the following formula:

$C2 = \operatorname{ceil}((D1+TA)/Ls)$, where C2 represents the first value, D1 represents the first LBT gap, TA represents the timing advance, Ls represents the symbol length, and ceil represents a ceiling operation.

9. The apparatus of claim 8, wherein the processor is configured to determine the second value based on a TA, a symbol length, and a second LBT gap.

10. The apparatus of claim 9, wherein the second value is determined by the following formula:

$C3 = \operatorname{ceil}((D2+TA)/Ls)$, where C3 represents the second value, D2 represents the second LBT gap, TA represents the timing advance, Ls represents the symbol length, and ceil represents a ceiling operation.

11. The apparatus of claim 8, wherein the processor is configured to acquire the second value from a received RAR.

12. The apparatus of claim 8, wherein the value of the CPE is determined in at least one of the following manners:

$CPE = C2*Ls - D1 - TA$; or, $CPE = C3*Ls - D2 - TA$;

where C2 represents the first value, C3 represents the second value, Ls represents a symbol length, D1 represents a first LBT gap, D2 represents a second LBT gap, and TA represents a timing advance.

13. The apparatus of claim 12, wherein D1 and D2 have different values.

14. The apparatus of claim 13, wherein one of D1 and D2 has a value of 16 μs, and another of D1 and D2 has a value of 25 μs, and another of D1 and D2 has a value of 25 μs.

* * * * *